W. A. LICKISS.
PIPE-COUPLING.

No. 178,245. Patented June 6, 1876.

WITNESSES
Nat. E. Oliphant
J. R. Porter

INVENTOR
William A. Lickiss
per Chas. H. Fowler,
Attorney.

UNITED STATES PATENT OFFICE.

WILLIAM A. LICKISS, OF EAST SAGINAW, MICHIGAN.

IMPROVEMENT IN PIPE-COUPLINGS.

Specification forming part of Letters Patent No. 178,245, dated June 6, 1876; application filed April 28, 1876.

*To all whom it may concern:*

Be it known that I, WILLIAM A. LICKISS, of East Saginaw, in the county of Saginaw and State of Michigan, have invented a new and valuable Improvement in Pipe-Coupling; and I do hereby declare that the following is a full, clear, and exact description of the construction and operation of the same, reference being had to the annexed drawings, making a part of this specification, and to the letters and figures of reference marked thereon.

Figure 1:
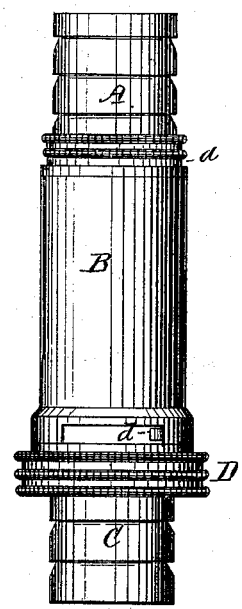
Figure 3:
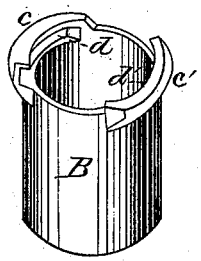
Figure 4:
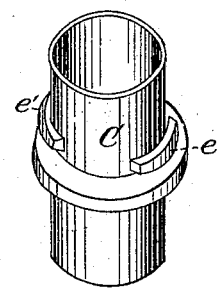
Figure 2:
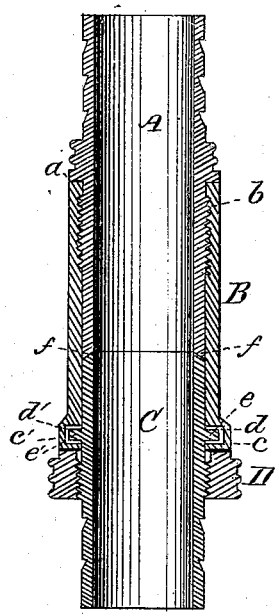

Figure 1 of the drawing is a representation of a perspective view of my invention. Fig. 2 is a central longitudinal section of the same. Figs. 3 and 4 are detached perspective views of the coupling-sleeve and one of the sections.

This invention has relation to hose and pipe couplings, and its object is to produce such devices simple in construction, and which will admit the several parts being readily coupled or connected together and firmly locked; and the invention consists in the combination and arrangement of the parts composing the coupling, as will be hereinafter more fully described, and subsequently pointed out in the claim.

In the accompanying drawings, A represents one section of the coupling formed with an annular shoulder, $a$, said shoulder being extended sufficiently to form a nut to facilitate handling of the section. The section is also provided with screw-threads $b$ for the reception of the screw-threaded end of a sleeve, B, said sleeve being enlarged at one end, and having two longitudinally-projecting lips or flanges, $c\ c'$, each of which is formed with an annular groove or channel, $d\ d'$, for the reception of correspondingly-formed projecting flanges $e\ e'$ upon the section C, by which the two are connected together. These flanges $e\ e'$ are sufficiently inclined, so that the two parts B C, when connected, are more securely drawn together. The section C is also provided with screw-threads upon its outer periphery, over which engages a locking-ring, D, for the purpose of firmly locking the two sections A C after being connected together, thereby forming a very simple, cheap, and effective coupling, and one that may be easily handled and operated.

It will be seen that the inner ends or edges of the sections A C, where they meet, are beveled off, as shown at $f\ f$, thus making a much nicer and more perfect joint at that point where they come in contact.

Having now fully described my invention, what I claim as new, and desire to secure by Letters Patent, is—

A hose or pipe coupling consisting of the sections A C, the latter having flanges $e\ e'$, and the sleeve B, with flanges or lips $c\ c'$, and grooves $d\ d'$, in combination with the locking-ring D, substantially as and for the purpose set forth.

In testimony that I claim the above I have hereunto subscribed my name in the presence of two witnesses.

WILLIAM A. LICKISS.

Witnesses:
JOHN A. HUBBARD,
JOHN M. BROOKS.